(12) United States Patent
Wada

(10) Patent No.: US 7,787,700 B2
(45) Date of Patent: Aug. 31, 2010

(54) SIGNAL PROCESSING METHOD, SIGNAL PROCESSING APPARATUS, COMPUTER-READABLE MEDIUM AND A DATA RECORDING MEDIUM

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 1101 days.

(21) Appl. No.: 11/446,185

(22) Filed: Jun. 5, 2006

(65) Prior Publication Data
US 2006/0274953 A1 Dec. 7, 2006

(30) Foreign Application Priority Data
Jun. 6, 2005 (JP) ............ P.2005-165779

(51) Int. Cl.
*G06K 9/36* (2006.01)
(52) U.S. Cl. ............ 382/232; 345/555; 348/390.1
(58) Field of Classification Search ............ 382/100, 382/232, 233, 235, 244, 254, 256, 257, 258; 345/555; 348/384.1–440.1
See application file for complete search history.

(56) References Cited

U.S. PATENT DOCUMENTS

| | | | | |
|---|---|---|---|---|
| 5,517,245 A | * | 5/1996 | Kondo et al. | 348/392.1 |
| 5,978,551 A | * | 11/1999 | Koyama | 358/1.2 |
| 6,301,395 B1 | * | 10/2001 | Nishigaki et al. | 382/266 |
| 7,006,695 B2 | * | 2/2006 | Yamada | 382/232 |
| 2002/0015513 A1 | * | 2/2002 | Ando et al. | 382/107 |
| 2002/0024548 A1 | * | 2/2002 | Gotoh et al. | 347/15 |
| 2002/0081034 A1 | * | 6/2002 | Yamada | 382/232 |
| 2003/0133007 A1 | * | 7/2003 | Iijima et al. | 348/46 |
| 2004/0101272 A1 | * | 5/2004 | Boston et al. | 386/46 |
| 2005/0271360 A1 | * | 12/2005 | Hirai | 386/52 |

FOREIGN PATENT DOCUMENTS

| | | |
|---|---|---|
| JP | 01-256288 | 10/1989 |
| JP | 11-261824 | 9/1999 |

OTHER PUBLICATIONS

Japanese Office Action dated Aug. 5, 2009 (with English translation).
Japanese Offidce Action dated Jan. 20, 2010 (with English translation).

\* cited by examiner

*Primary Examiner*—Anand Bhatnagar
(74) *Attorney, Agent, or Firm*—McGinn IP Law Group, PLLC

(57) ABSTRACT

A signal processing method comprises: generating thinned data by thinning, in a checkerboard like manner, image data comprising a plurality of pixels that are arranged, as a square, in a row direction and in a column direction perpendicular to the row direction; generating a first square array by extracting odd-numbered lines from lines of the thinned data in the row direction and in the column direction, and generating a second square array by extracting even-numbered lines from the lines of the thinned data in the row direction and in the column direction; and performing an image compression process for each of the first square array and the second square array.

5 Claims, 9 Drawing Sheets

FIG. 2

IMAGE DATA

| D(1,1) | D(1,2) | D(1,3) | D(1,4) | D(1,5) | · · · |
|--------|--------|--------|--------|--------|-------|
| D(2,1) | D(2,2) | D(2,3) | D(2,4) | D(2,5) | · · · |
| D(3,1) | D(3,2) | D(3,3) | D(3,4) | D(3,5) | · · · |
| D(4,1) | D(4,2) | D(4,3) | D(4,4) | D(4,5) | · · · |
| D(5,1) | D(5,2) | D(5,3) | D(5,4) | D(5,5) | · · · |
| ⋮ | ⋮ | ⋮ | ⋮ | ⋮ | |

FIG. 3

THINNED DATA

| A(1,1) |        | A(1,2) |        | A(1,3) | · · · |
|--------|--------|--------|--------|--------|-------|
|        | B(1,1) |        | B(1,2) |        | · · · |
| A(2,1) |        | A(2,2) |        | A(2,3) | · · · |
|        | B(2,1) |        | B(2,2) |        | · · · |
| A(3,1) |        | A(3,2) |        | A(3,3) | · · · |
| ⋮      | ⋮      | ⋮      | ⋮      | ⋮      |       |

FIG. 4A

| A(1,1) | A(1,2) | A(1,3) | · · · |
|--------|--------|--------|-------|
| A(2,1) | A(2,2) | A(2,3) | · · · |
| A(3,1) | A(3,2) | A(3,3) | · · · |
| ⋮ | ⋮ | ⋮ | |

FIG. 4B

| B(1,1) | B(1,2) | B(1,3) | · · · |
|--------|--------|--------|-------|
| B(2,1) | B(2,2) | B(2,3) | · · · |
| B(3,1) | B(3,2) | B(3,3) | · · · |
| ⋮ | ⋮ | ⋮ | |

| R(1,1) | | R(1,2) | | R(1,3) | · · · |
|---|---|---|---|---|---|
| | S(1,2) | | S(1,2) | | · · · |
| R(2,1) | | R(2,2) | | R(2,3) | · · · |
| | S(2,1) | | S(2,2) | | · · · |
| R(3,1) | | R(3,2) | | R(3,3) | · · · |
| ⋮ | ⋮ | ⋮ | ⋮ | ⋮ | |

23

FILTER

FIG. 7

RESTORED IMAGE DATA

| IP(1,1) | IP(1,2) | IP(1,3) | IP(1,4) | IP(1,5) | · · · |
|---------|---------|---------|---------|---------|-------|
| IP(2,1) | IP(2,2) | IP(2,3) | IP(2,4) | IP(2,5) | · · · |
| IP(3,1) | IP(3,2) | IP(3,3) | IP(3,4) | IP(3,5) | · · · |
| IP(4,1) | IP(4,2) | IP(4,3) | IP(4,4) | IP(4,5) | · · · |
| IP(5,1) | IP(5,2) | IP(5,3) | IP(5,4) | IP(5,5) | · · · |
| ⋮ | ⋮ | ⋮ | ⋮ | ⋮ | |

IMAGE SEGMENT A

IMAGE SEGMENT B

SIGNAL PROCESSING METHOD, SIGNAL PROCESSING APPARATUS, COMPUTER-READABLE MEDIUM AND A DATA RECORDING MEDIUM

BACKGROUND OF THE INVENTION

1. Field of the Invention

The present invention relates to a signal processing method and a signal processing apparatus for performing image compression, for input image data, or expansion, for compressed image data, and a computer-readable medium and a data recording medium.

2. Description of the Related Art

Various systems have appeared that provide numerous services for the processing of digital image data. For example, available today are systems that provide services for saving and managing digital image data obtained while using scanners to scan negative film or while using digital cameras to take pictures, and systems that provide services for the transmission of such digital image data across networks.

FIG. 10 is a block diagram showing the transmission side of the related-art still picture transmission apparatus. The still picture transmission apparatus in FIG. 10 is the related-art example related to the transmittal of digital image data when a homepage is browsed or when a digital image data transmission service is provided, for example, for a video telephone, i.e., this is related to an improvement in an image data transmission technique employing the JPEG (Joint Photographic Experts Group) compression system, which is a generally known digital image data compression system.

First, a digital image creation unit 101 receives digital image data from an image pickup unit such as a CCD, or a recording medium such as a hard disk, and converts the digital image data into 8-bit data consisting of a luminance signal and a color difference signal. In order to perform the JPEG compression for the thus created digital image data, an image division/compression unit 102 divides one screen into a plurality of blocks, each of which is a well known square array of 8×8 pixels. As a result, one screen=blocks of n rows×m columns, and one block is a square array of 8×8 pixels. Then, DCT processing is performed for the 8×8 pixels in each of the thus obtained blocks. As is well known, for DCT processing, a matrix operation is performed for the original image data of 8×8 pixels by using a cosine coefficient transpose and a cosine coefficient, and a spacial coordinate axis is transformed into a frequency coordinate axis to divide the frequency into a low frequency element and a high frequency element.

Further, the image division/compression unit 102 creates two screens of n×m blocks, and thins blocks in the two block division screens A and B to obtain the checkerboard like patterns shown in FIGS. 11A and 11B. During the thinning process, when the screen A, for example, includes an odd number of rows and an odd number of block columns, normal quantization is performed, but when an odd number of rows and an even number of columns are included, only the DC coefficient is quantized and 0 is employed as the AC coefficient. In a case such as that for the division screen A in FIG. 11A, white blocks are regarded as normally quantized blocks, and shaded blocks are regarded as blocks of "0" and are thinned in a checkerboard like manner. It should be noted that in the well known quantization operation, the coefficient matrix of a square array obtained by the DCT processing is divided by using a square array quantization table, and while the low frequency element located at the upper left in the matrix is finely quantized, the high frequency element located at the lower right is only roughly quantized. In another quantization process to be performed in this case, only the DC coefficient located at the topmost left end is quantized, and all the other AC coefficients are regarded as 0. The thinning process using the two quantization operations is performed for the two screens A and B, and as a result, the division screens A and B shown in FIGS. 11A and 11B are obtained. Image data thinned using quantization are encoded by using Huffman coding, and the resultant data are output as JPEG compressed data by an image data transmission unit 103.

To receive the compressed image data output via a transmission network 104, such as the Internet, white blocks are extracted from the division screens A and B based on ID information and are synthesized to form the original screen, and the inverse transformation of JPEG compressed data is performed by an expansion unit, to decode the image data, and the resultant data are displayed (see JP-A-11-261824).

However, to perform image data compression or expansion at a higher speed and at a lower cost, when the data are still pixel data, effective means is required for reducing the volume of the data to be compressed, such as that required for still pictures, before the compression process is performed. However, were pixel data, to reduce their volume, simply thinned vertically or transversely, the resolution would be reduced vertically or transversely, and the image quality would be greatly affected. But when pixel data are thinned in a checkerboard like manner, a reduction in the vertical or the transverse resolution is prevented, and the image quality is less affected. On the other hand, since the pixel data are thinned in the checkerboard like manner, an operation for a square array, such as quantization using a quantization table, can not be performed. Therefore, both for a case wherein image data are compressed without the screen being divided into blocks and for a case, as described in JP-A-11-261824, wherein the screen is divided into blocks of 8×8 pixels, a pixel array can not be shaped like a square when the pixel thinning process is performed in advance. Thus, performing the compression process is impossible, and image data can not be compressed.

In order to resolve these shortcomings, one objective of the present invention is to provide a signal processing method and a signal processing apparatus, for enabling image data compression while reducing the amount of data to be compressed, without the image quality being deteriorated, and that can perform the compression and expansion of image data at a high speed and at a low cost, and a computer-readable medium and a data recording medium.

SUMMARY OF THE INVENTION

The objective of the invention is achieved by the following configurations.

(1) A signal processing method comprising:

generating thinned data by thinning, in a checkerboard like manner, image data comprising a plurality of pixels that are arranged, as a square, in a row direction and in a column direction perpendicular to the row direction;

generating a first square array by extracting only odd-numbered lines from lines of the thinned data in the row direction and in the column direction, and generating a second square array by extracting only even-numbered lines from the lines of the thinned data in the row direction and in the column direction; and performing an image compression process for each of the first square array and the second square array.

According to this signal processing method, thinned data are generated by thinning, in a checkerboard like manner, image data formed of a plurality of pixels that are arranged as a square; the first square array and the second square array are generated by respectively extracting only the odd-numbered lines and the even-numbered lines from the lines of thinned data in the row direction and in the column direction; and the image compression process is performed separately for the first and the second square arrays. Thus, image compression can be performed at the pixel stage, while the volume of data to be compressed can be reduced without the image quality being deteriorated.

(2) A signal processing method comprising:

generating thinned data by thinning, in a checkerboard like manner, image data comprising a plurality of pixels that are arranged, as a square, in a row direction and in a column direction perpendicular to the row direction;

generating a first square array by extracting only odd-numbered lines from lines of the thinned data in the row direction and in the column direction, and generating a second square array by extracting only even-numbered lines from the lines of the thinned data in the row direction and in the column direction;

performing an image compression process, for compressing image data for the first square array to generate first compressed data, and for compressing image data for the second square array to generate second compressed data; and performing an image expansion process, for expanding the first compressed data to generate first expanded data, and for expanding the second compressed data to generate second expanded data, for rearranging, at every other pixel, the first expanded data on the odd-numbered lines, and for rearranging, at every other pixel, the second expanded data on the even-numbered lines, to form a restored image having the checkerboard like manner.

According to this signal processing method, the thinned data are generated by thinning, in the checkerboard like manner, image data formed of pixels that are arranged in a square; the first square array and the second square array are generated by respectively extracting the odd-numbered lines and the even-numbered lines from the lines of the thinned data in the row direction and in the column direction; and the first compressed data and the second compressed data can be obtained by compressing image data for the first square array and the second square array. Further, the first expanded data and the second expanded data are generated by expanding the first compressed data and the second compressed data; and the first expanded data are rearranged, at every other pixel, on the odd-numbered lines, while the second expanded data are rearranged, at every other pixel, on the even-numbered lines, so that a restored image having a checkerboard like pattern can be obtained.

(3) A signal processing method according to (2), wherein, for a blank pixel that has not been involved in a rearrangement for obtaining the restored image, a pixel value is set by an interpolating processing using at least one peripheral pixel of the blank pixel.

According to this signal processing method, a restored image can be obtained that is similar to the original image data.

(4) A signal processing apparatus comprising:

a thinning unit that generates thinned data by thinning, in a checkerboard like pattern, image data comprising a plurality of pixels that are arranged as a square in a row direction and in a column direction perpendicular to the row direction;

a data division unit that generates a first square array by extracting odd-numbered lines from lines of the thinned data in the row direction and in the column direction, and generates a second square array by extracting even-numbered lines from the lines of the thinned data; and an image compression unit that performs an image compression process for each of the first square array and the second square array.

According to this signal processing apparatus, the thinning unit generates thinned data by thinning, in a checkerboard like manner, image data formed of a plurality of pixels that are arranged as a square; the data division unit generates the first square array and the second square array by respectively extracting only the odd-numbered lines and the even-numbered lines from the lines of thinned data in the row direction and in the column direction; and the image compression unit performs the image compression process separately for the first and the second square arrays. Thus, image compression can be performed at the pixel stage, while the volume of data to be compressed can be reduced without the image quality being deteriorated.

(5) A signal processing apparatus comprising:

a thinning unit that generates thinned data by thinning, in a checkerboard like manner, image data comprising a plurality of pixels that are arranged as a square in a row direction and in a column direction perpendicular to the row direction;

a data division unit that generates a first square array by extracting odd-numbered lines from lines of the thinned data in the row direction and in the column direction, and generates a second square array by extracting even-numbered lines from the lines of the thinned data;

an image compression unit that performs an image compression process for the first square array to generate first compressed data, and performs an image compression process for the second square array to generate second compressed data;

an image expansion unit that expands the first compressed data to generate first expanded data, and expands the second compressed data to generate second expanded data; and a restored image generation unit that rearranges, at every other pixel, the first expanded data on the odd-numbered lines, and rearranges, at every other pixel, the second expanded data on the even-numbered lines, to form a restored image having the checkerboard like manner.

According to this signal processing apparatus, the thinning unit generates thinned data by thinning, in the checkerboard like manner, image data formed of pixels that are arranged in a square; the data division unit generates the first square array and the second square array by respectively extracting the odd-numbered lines and the even-numbered lines from the lines of the thinned data in the row direction and in the column direction; and the image compression unit obtains the first compressed data and the second compressed data by compressing image data for the first square array and the second square array. Further, the image expansion unit generates the first expanded data and the second expanded data by expanding the first compressed data and the second compressed data; and the restored image generation unit rearranges the first expanded data, at every other pixel, on the odd-numbered lines, and rearranges the second expanded data, at every other pixel, on the even-numbered lines, so that a restored image having a checkerboard like pattern can be obtained.

(6) A signal processing apparatus according to (5), further comprising: an interpolation unit that sets a pixel value for a blank pixel that has not been involved in a rearrangement for obtaining the restored image, by an interpolating processing using at least one peripheral pixel of the blank pixel.

According to this signal processing apparatus, a restored image can be obtained that is similar to the original image data.

(7) A computer-readable medium including set of instructions comprising:

generating thinned data by thinning, in a checkerboard like manner, image data comprising a plurality of pixels that are arranged, as a square, in a row direction and in a column direction perpendicular to the row direction;

generating a first square array by extracting odd-numbered lines from lines of the thinned data in the row direction and in the column direction, and generating a second square array by extracting even-numbered lines from the lines of the thinned data in the row direction and in the column direction; and performing an image compression process for each of the first square array and the second square array.

(8) A computer-readable medium including set of instructions comprising:

generating thinned data by thinning, in a checkerboard like manner, image data comprising a plurality of pixels that are arranged, as a square, in a row direction and in a column direction perpendicular to the row direction;

generating a first square array by extracting only odd-numbered lines from lines of the thinned data in the row direction and in the column direction, and generating a second square array by extracting only even-numbered lines from the lines of the thinned data in the row direction and in the column direction;

performing an image compression process, for compressing image data for the first square array to generate first compressed data, and for compressing image data for the second square array to generate second compressed data; and performing an image expansion process, for expanding the first compressed data to generate first expanded data, and for expanding the second compressed data to generate second expanded data, for rearranging, at every other pixel, the first expanded data on the odd-numbered lines, and for rearranging, at every other pixel, the second expanded data on the even-numbered lines, to form a restored image having the checkerboard like manner.

According to the computer-readable medium, the above described signal processing can be performed by a computer. The computer-readable medium can be embodied by installing a program corresponding to the set of instructions in the computer.

(9) A data recording medium which stores compressed image data created by a signal processing method according to one of (1) to (3) or by a signal processing apparatus according to one of (4) to (6).

When compressed image data, prepared using the above signal processing method or the above signal processing apparatus, are stored on this data recording medium, the storage, transfer or distribution of image data can be performed.

BRIEF DESCRIPTION OF THE DRAWINGS

FIG. 2 is a diagram showing image data received at a data input section in FIG. 1;

FIG. 3 is a diagram showing thinned data obtained by a thinning unit shown in FIG. 1;

FIGS. 4A and 4B are diagrams showing a square array image segment A and a square array image segment B, respectively obtained by dividing thinned image data in FIG. 3;

FIG. 7 is a diagram showing restored image data obtained by interpolation using the filter coefficient in FIG. 6;

DETAILED DESCRIPTION OF THE INVENTION

A signal processing method and a signal processing apparatus according to the preferred embodiment of the present invention will now be described in detail while referring to the accompanying drawings.

Figure 1:
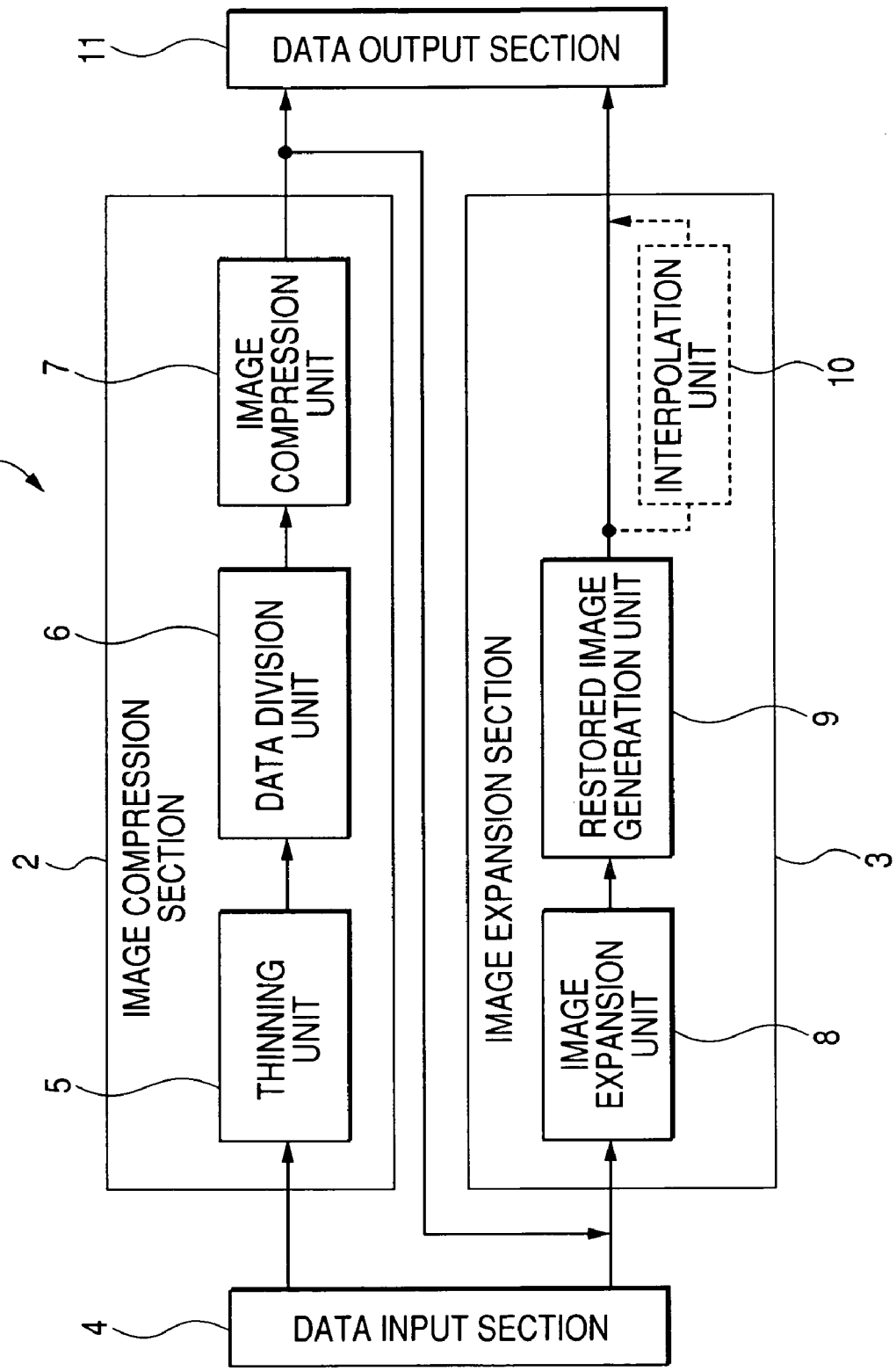
FIG. 1 is a block diagram showing the configuration of a signal processing apparatus according to the present invention.

FIG. 1 is a block diagram showing the configuration of a signal processing apparatus according to the embodiment. FIG. 2 is a diagram showing image data received at a data input section in FIG. 1 FIG. 3 is a diagram showing thinned data generated by a thinning unit shown in FIG. 1. FIGS. 4A and 4B are diagrams showing a square array image segment A and a square array image segment B, respectively obtained by dividing the thinned image data shown in FIG. 3.

In a signal processing apparatus 1 in FIG. 1, a data input section 4 receives image data D(i,j), shown in FIG. 2, from an image pickup unit, such as a CCD, or an arbitrary type of recording medium, such as a hard disk or a memory card. In this case, i denotes a row number and j denotes a column number. For each odd numbered line A(i,j) and each even-numbered line B(i,j), a thinning unit 5 of an image compression section 2 thins the input image data in a checkerboard like pattern, as shown in FIG. 3, and generates a thinned image. A data division unit 6 divides the thus obtained image into a square array image segment only for odd-numbered lines A, as shown in FIG. 4A, and a square array image segment only for even-numbered lines B, as shown in FIG. 4B. An image compression unit 7 performs a normal, well known image compression, such as the DCT processing, the quantization and the encoding, for the square array image segments A and B, and transmits the compressed data to a data output section 11, which outputs the data to a network or to a recording medium, and an image expansion section 3.

Figures 5, 6:
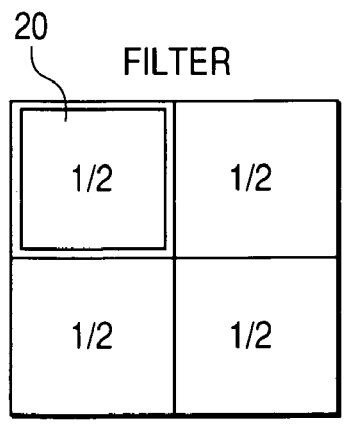
FIG. 5 is a diagram showing a synthesis image where the square array image segments A and B in FIG. 4 are rearranged in a checkerboard like pattern.
FIG. 6 is a diagram sowing a filter coefficient used to interpolate an image in the checkerboard like pattern shown in FIG. 5.

FIG. 5 is a diagram showing a synthesis image wherein the image segments A and B in the square arrays shown in FIG. 4 are rearranged in checkerboard like patterns.

The image expansion section 3 receives a compressed image from the data input section 4 or the image compression section 2. An image expansion unit 8 performs an expansion process for the square array image segments A and B, in order, for Huffman decoding, inverse quantization and inverse DCT processing. Then, a restored image generation unit 9 rearranges the expanded image segments A and B in their original checkerboard like patterns to generate images R and S, as shown in FIG. 5. An interpolation unit 10 then interpolates pixels by performing the convolution operation using, for example, a filter coefficient shown in FIG. 6, so that the state shown in FIG. 7, which is similar to the image before the thinning process was performed, can be restored. Thereafter, the restored image is output to the data output section 11 that outputs data to a recording medium or a display device. It should be noted that the processes performed by the individual units represent the contents of a signal processing program executed by the CPU of a computer (not shown). When the compressed image data prepared by the signal processing program are stored on a data recording medium, such as an optical disk or a magnetic disk, the management, transfer and distribution of image data are enabled. Further, not only are the image data stored on a data recording medium, but the image data can also be transmitted via the Internet.

The image compression processing performed by the image compression section 2 will now be described in detail.

Figure 8:
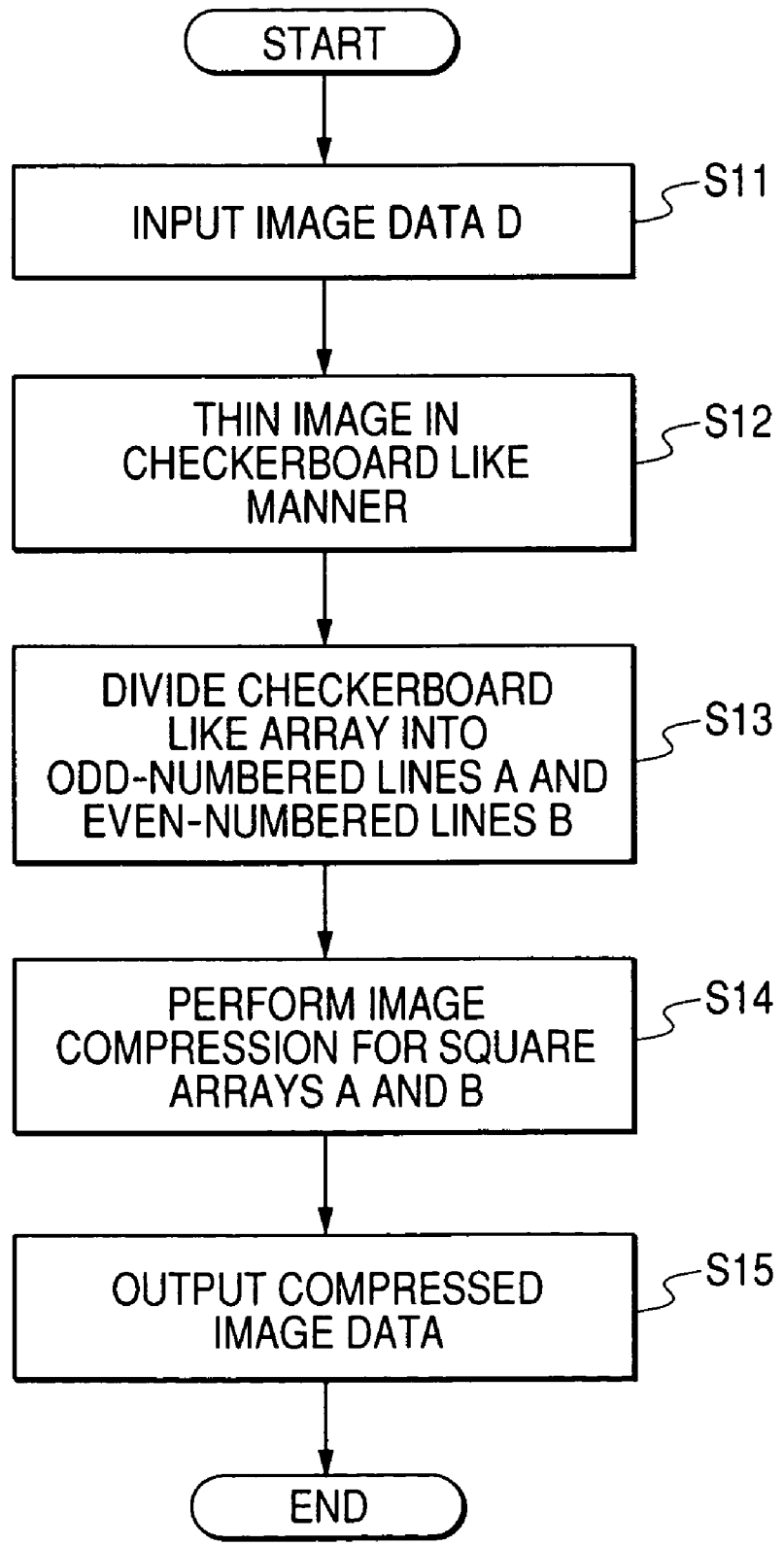
FIG. 8 is a flowchart showing the processing performed by an image compression section in FIG. 1.

FIG. 8 is a flowchart showing the processing performed by the image compression section 2 in FIG. 1. The image compression processing will now be explained while referring to this flowchart.

First, from an image pickup unit, such as a CCD or a recording medium, such as a memory card or a hard disk, image data D(i,j) are received by the data input section 4 (S11). Then, the individual pixels D(i,j) of the input image are thinned in the checkerboard like pattern shown in FIG. 3 (S12). Following this, pixels A(i,j) and pixels B(i,j) are defined by employing an odd-numbered line as a pixel A and an even-numbered line as a pixel B.

Sequentially, the obtained pixels A and B in the checkerboard like pattern shown in FIG. 3 are divided into image A and image B, and a first square array and a second square array are generated by respectively extracting only odd-numbered lines and only even-numbered lines (S13). The results are shown in FIGS. 5A and 5B, i.e., a square array image segment formed of pixels A is shown in FIG. 5A, and a square array image segment formed of pixels B is shown in FIG. 5B.

The square array image segments A and B, which are the first square array and the second square array, are compressed separately (S14). The obtained compressed data are regarded as first compressed image data relative to the first square array and as second compressed image data relative to the second square array. In this case, a normal compression process is employed. For example, the JPEG compression, the DCT processing, quantization using zigzag scanning and Huffman encoding are performed for a square array consisting of a block of 8×8 pixels. Various ID information, such as pixel IDs, thinned pixel data, image segments, image segment counts, block counts and image file names, are inserted into the compressed data, and the resultant compressed image file is output to the image expansion section 3 and the data output section 11 that is connected to a recording medium or to a network (S15).

The image expansion processing performed by the image expansion section 3 will now be explained in detail.

Figure 9:
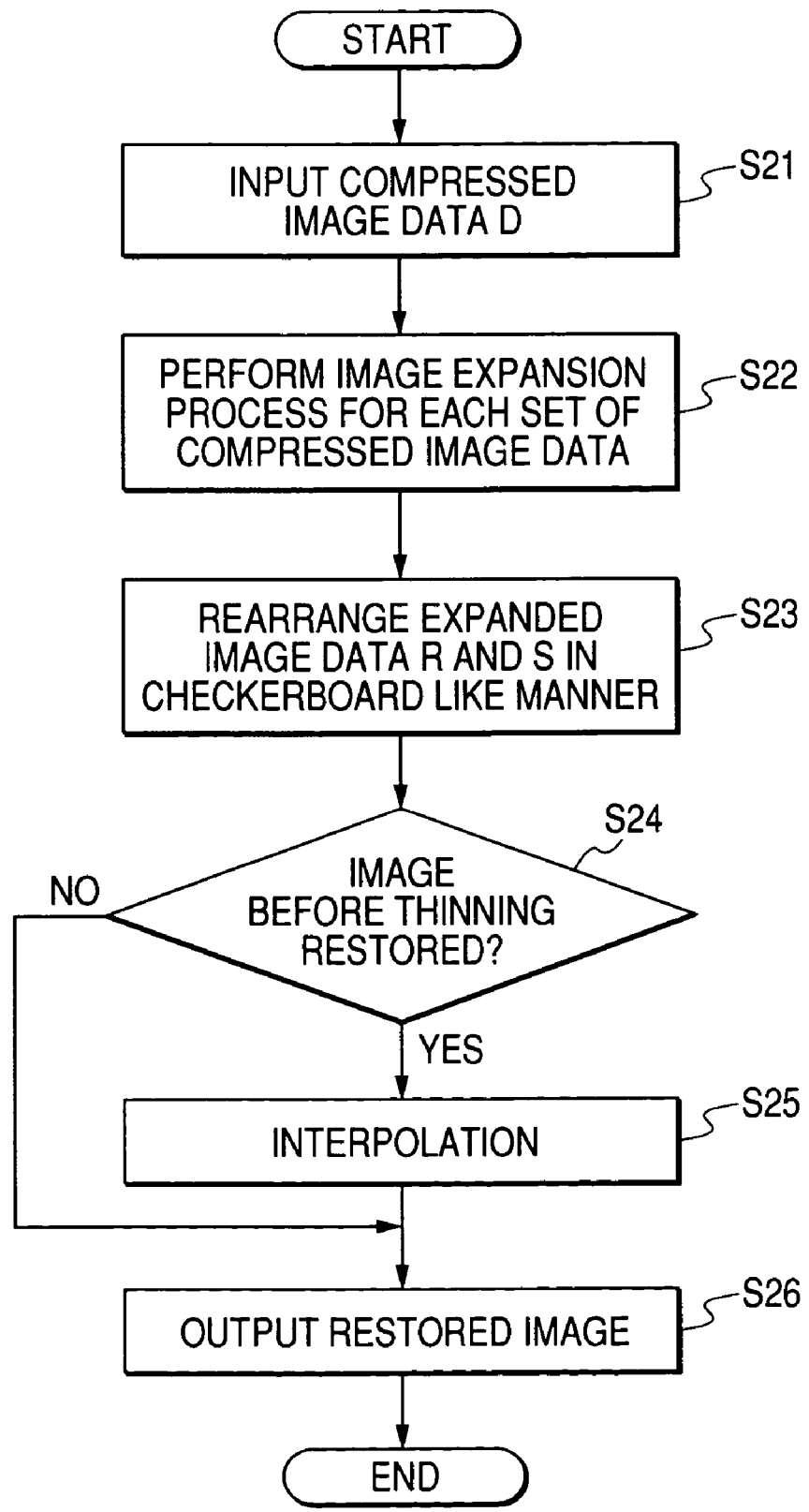
FIG. 9 is a flowchart showing the processing performed by an image expansion section in FIG. 1.
Figure 10:
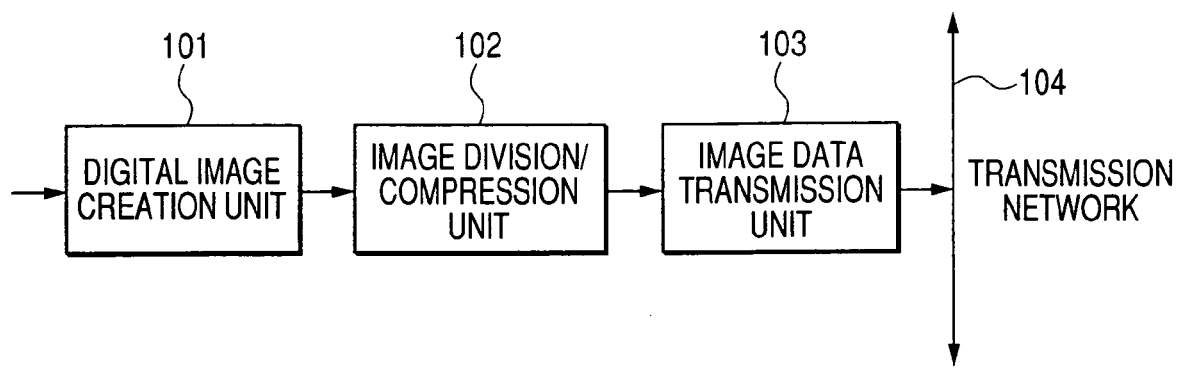
FIG. 10 is a block diagram showing the related-art still picture transmission apparatus.
Figure 11A:
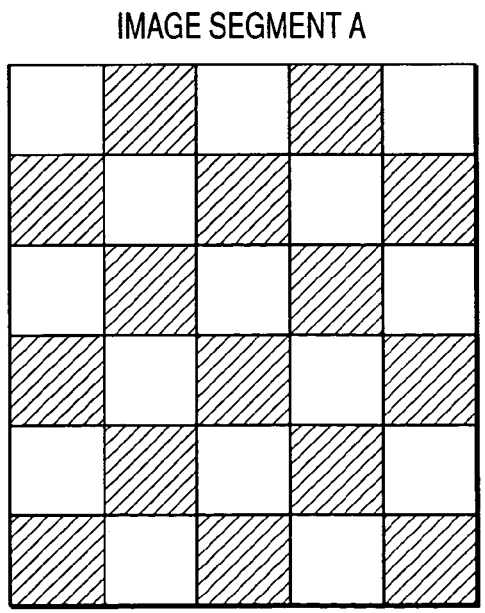
FIGS. 11A and 11B are diagrams for explaining two image segments employed by a still picture transmission apparatus shown in FIG. 10.
Figure 11B:
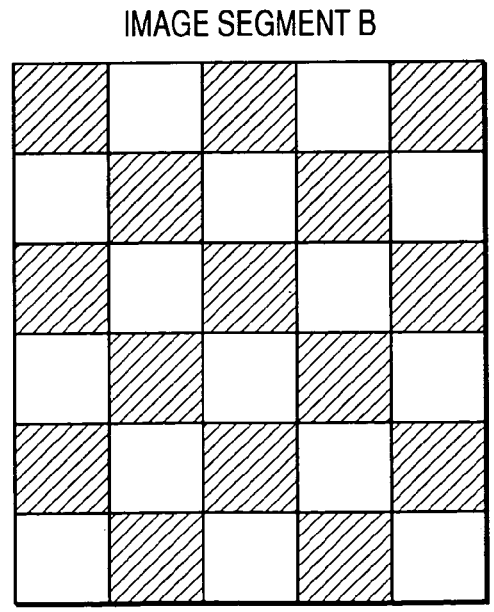

FIG. 9 is a flowchart showing the processing performed by the image expansion section 3 shown in FIG. 1. The image expansion processing will now be explained while referring to this flowchart.

The image expansion section 3 receives the first and second compressed image data from the image compression section 2, or from a recording medium via the data input section 4 (S21). Then, the image expansion unit 8 performs an expansion process for the received first and second compressed image data (S22). This expansion process is a normal process, i.e., Huffman decoding, which is a reversible process, quantization, which is a non-reversible process, and inverse quantization and inverse operations for the DCT processing are performed.

Sequentially, while referring to the ID information, such as the ID symbols for individual pixels, the first expanded data and the second expanded data, which are obtained by expanding the first and second compressed image data, are rearranged in the checkerboard like patterns for R(i,j) and S(i,j) before the pixels were divided, as shown in the synthesis image in FIG. 5 (S23). In this case, the odd-numbered line R(i,j) corresponds to A(i,j) in FIG. 3, and the even-numbered line S(i,j) corresponds to B(i,j) in FIG. 3.

That is, the first expanded data are generated by expanding the first compressed data, and the second expanded data are generated by expanding the second compressed data. Further, the first expanded data are rearranged, at every other pixel, on the odd-numbered lines, and the second expanded data are rearranged, at every other pixel, on the even-numbered lines, so that a restored image is generated that has a checkerboard like pattern.

When the data obtained through the expansion process are rearranged in the checkerboard like pattern in the above described manner, the thinned image shown in FIG. 3 can be restored. Thereafter, a check is performed to determine whether the state in FIG. 2, before the thinning process was performed, should be restored (S24) When the restoration process is to be performed, the interpolation operation is performed. During this process, pixels are generated, by interpolation, by referring to the peripheral pixels of the blank pixels in the checkerboard like pattern image in FIG. 5 that are not employed for the rearrangement, and the positions of the blank pixels are filled by using the generated pixels (S25). For the interpolation, a convolution operation using a well known filtering process is performed. An example filter employed for the filtering process is shown in FIG. 6. According to this filter, a blank pixel is interpolated by a filter coefficient at a reference position 20. For example, a value of R(1,2)/2+S(1,1)/2 is designated at a pixel 23 in FIG. 5 (corresponds to IP(1,2) in FIG. 7).

In this manner, the restored image data IP(i,j), shown in FIG. 7, that is filled with image data before the thinning process was performed are restored, and are displayed as a restored image on a display device (S26).

As described above, according to the signal processing method of the invention, image compression is enabled while the amount of data to be compressed is reduced, without the image quality being deteriorated, and data compression and expansion can be performed at a high speed and at a low cost.

The JPEG system for still picture compression has been employed for a compression system. However, the present invention is not limited to this, and the MPEG or another compression system can be also be employed.

According to the invention, image data, arranged in a checkerboard like pattern, that are obtained by thinning pixels is divided into even numbered lines and odd numbered lines, and data compression and expansion are performed while the data are employed as square arrays. As a result, deterioration of a vertical or transverse resolution, which causes the thinning process and adversely affects the image quality, can be prevented, and since the volume of the data to be compressed can be reduced, an increase in compression speed and a reduction in cost are enabled.

The entire disclosure of each and every foreign patent application from which the benefit of foreign priority has been claimed in the present application is incorporated herein by reference, as if fully set forth.

What is claimed is:

1. A signal processing method using a processor, comprising:

generating a thinned image by thinning, in a checkerboard like manner, image data comprising a plurality of pixels that are arranged, as a square, in a row direction and in a column direction perpendicular to the row direction;

generating a first square array by extracting only odd-numbered lines from lines of the thinned image in the row direction and in the column direction, and generating a second square array by extracting only even-numbered lines from the lines of the thinned image in the row direction and in the column direction;

performing an image compression process, for compressing image data for the first square array to generate first compressed data, and for compressing image data for the second square array to generate second compressed data; and performing an image expansion process, for expanding the first compressed data to generate first expanded data, and for expanding the second compressed data to generate second expanded data, for rearranging, at every other pixel, the first expanded data on the odd-numbered lines, and for rearranging, at every other pixel, the second expanded data on the even-numbered lines, to form a restored image having the checkerboard like manner.

2. A signal processing method according to claim 1, wherein, for a blank pixel that has not been involved in a rearrangement for obtaining the restored image, a pixel value is set by an interpolating processing using at least one peripheral pixel of the blank pixel.

3. A signal processing method according to claim 1, wherein the generating the first square array and the generating the second square array are performed using one said thinned image.

4. A computer-readable medium encoded with computer executable instructions, comprising:

generating a thinned image by thinning, in a checkerboard like manner, image data comprising a plurality of pixels that are arranged, as a square, in a row direction and in a column direction perpendicular to the row direction;

generating a first square array by extracting only odd-numbered lines from lines of the thinned image in the row direction and in the column direction, and generating a second square array by extracting only even-numbered lines from the lines of the thinned image in the row direction and in the column direction;

performing an image compression process, for compressing image data for the first square array to generate first compressed data, and for compressing image data for the second square array to generate second compressed data; and performing an image expansion process, for expanding the first compressed data to generate first expanded data, and for expanding the second compressed data to generate second expanded data, for rearranging, at every other pixel, the first expanded data on the odd-numbered lines, and for rearranging, at every other pixel, the second expanded data on the even-numbered lines, to form a restored image having the checkerboard like manner.

5. A computer-readable medium encoded with computer executable instructions according to claim 4, wherein the generating the first square array and the generating the second square array are performed using one said thinned image.

* * * * *